March 10, 1953    C. W. CLAPP    2,631,188
ELECTRICAL TESTING APPARATUS
Filed Oct. 6, 1949    3 Sheets-Sheet 1

Inventor:
Charles W. Clapp,
by Paul A. Frank
His Attorney.

March 10, 1953 — C. W. CLAPP — 2,631,188
ELECTRICAL TESTING APPARATUS
Filed Oct. 6, 1949 — 3 Sheets-Sheet 2

Inventor:
Charles W. Clapp,
by Paul A. Frank
His Attorney.

March 10, 1953  C. W. CLAPP  2,631,188
ELECTRICAL TESTING APPARATUS
Filed Oct. 6, 1949  3 Sheets-Sheet 3

Inventor:
Charles W. Clapp,
by Paul A. Frank
His Attorney.

Patented Mar. 10, 1953

2,631,188

UNITED STATES PATENT OFFICE 2,631,188

ELECTRICAL TESTING APPARATUS

Charles W. Clapp, Scotia, N. Y., assignor to General Electric Company, a corporation of New York Application October 6, 1949, Serial No. 119,934

14 Claims. (Cl. 175—183)

This invention relates to improved testing apparatus for testing electrical characteristics of materials and of electric circuit components, and in particular to improved apparatus for locating tramp metal in ore.

In ore concentration processes where crushing machinery is used to pulverize the ore, damage to the machinery may result from the presence of large pieces of tramp iron or other metal, which may be broken parts of drills or other mining machinery, inadvertently present in the ore. It has previously been proposed that such tramp iron be located by magnetic means. However, much iron ore, in particular the mineral taconite, is itself strongly magnetic, and since the pieces of tramp iron may be relatively small compared to the large volumes of ore to be handled, detection by purely magnetic means is not always feasible.

An object of this invention is to provide improved apparatus for detecting the presence of tramp metal in magnetic ore such as taconite.

It has been found that ores such as taconite, although highly magnetic, have an average volume resistivity much higher than that of solid metals such as metallic iron, steel, or brass. If such ore is placed within the alternating magnetic field of an inductor, excited at a frequency of five thousand cycles per second, for example, the magnetic nature of the ore will cause a substantial increase in the reactance of the inductor, but essentially no increase in the electrical losses associated with the inductor. On the other hand, a piece of metallic iron about one inch in diameter, or larger, will cause an appreciable increase in the electrical losses because of the relatively large eddy currents induced within the metal. Thus the presence of tramp metal may be detected by measuring the increase in electrical losses produced when the ore to be tested is placed within the magnetic field of an excited inductor.

Apparatus for utilizing this method may comprise a coil placed around or near a conveyor belt carrying the ore to be tested, so that ore passes through the magnetic field of the coil. Connected to the coil is suitable electrical apparatus for measuring changes in the electrical losses associated with the coil. There is some difficulty in this, since the losses produced by eddy currents in tramp metal to be detected may cause a change in the apparent resistance of the coil which is as small as one-tenth of one percent of the inductive reactance of the coil, and may be of the order of only about two percent of the apparent resistance due to normal coil losses.

Another object of this invention is to provide improved apparatus capable of actuation by these small changes in apparent resistance without responding to changes in the inductance of the coil produced by the magnetic ore. For this and other purposes hereinafter set forth, improved circuits are provided which can be made to respond to changes in one component of an impedance, resistance, for example, while being insensitive to other components, such as inductance.

It will be appreciated that the circuits to be described are also useful for testing other materials by measuring changes in their electrical losses or other electrical characteristics. For example, losses of a dielectric material can be tested by placing the dielectric material between the plates of a capacitor connected in a circuit similar to those hereinafter described. The circuits can be used in this manner to inspect dielectric materials to be used in making capacitors, or as a moisture monitor for materials having dielectric properties which vary as a function of moisture, or for other purposes. Thus, in general terms, a material to be tested is placed within the alternating electromagnetic field of an excited reactor, either an inductor or a capacitor, and changes in a component of the electrical impedance associated with the reactor are detected by the circuits described. Or, instead of testing a material, the inherent electrical characteristics of a circuit element may be tested by connecting such element in the circuit as hereinafter explained.

Another object of this invention is to provide improved circuits for detecting small changes in a component of the electrical impedance associated with an electrical circuit element, even in the presence of relatively large changes in other impedance components.

Other objects and advantages will appear as the description proceeds. The features of this invention which are believed to be novel and patentable are pointed out in the claims which form a part of this specification.

For a better understanding of the invention, reference is made in the following description to the accompanying drawings in which.

Figure 1:
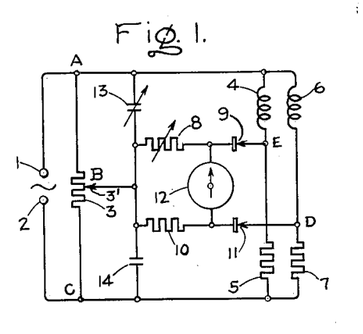
Fig. 1 is a circuit diagram of apparatus embodying principles of this invention.

Referring now to Fig. 1, terminals 1 and 2 are provided for connection to a suitable source of alternating current, for example, an oscillator which may provide output current having a frequency of about five thousand cycles per second. A voltage divider 3 having a variable tap 3' is connected across terminals 1 and 2. With reference to tap 3' of the voltage divider as a neutral terminal, two-phase voltage is provided at terminals 1 and 2. Of course, other voltage supply means having balanced two-phase and neutral terminals may be used.

Also connected across terminals 1 and 2 are passive circuits comprising an inductor 4 in series with a resistor 5, and an inductor 6 in series with a resistor 7. When this circuit is to be used for testing materials, inductor 4 is constructed so that the material to be tested may be placed within its magnetic field. For example, inductor 4 may be a coil located around or adjacent to a conveyor belt carrying ore to be tested for the presence of tramp metal, or it may be a plurality of such coils electrically connected together. Preferably, both 4 and 6 are air-core inductors having minimum inherent coil losses, and resistors 5 and 7 are substantially non-inductive.

Connected between tap 3' and the circuit junction between inductor 4 and resistor 5 is a variable resistor 8 in series with a rectifier 9. Connected between the voltage divider tap and the circuit junction between inductor 6 and resistor 7 is a resistor 10 in series with a rectifier 11. In this embodiment of the invention, the two inductor-resistor branches 4—5 and 6—7 are connected across terminals 1 and 2 in the same order, as shown, and rectifiers 9 and 11 have the same polarity. A D.-C. galvanometer 12 is connected between the junction of resistor 8 with rectifier 9 and the junction of resistor 10 with rectifier 11. Capacitors 13 and 14 may be connected from tap 3' to respective ends of voltage divider 3 for purposes hereinafter described.

Although the circuit values are not critical, it is preferable that, with no test material present, inductors 4 and 6 and resistors 5 and 7 have about equal impedance values. The best value for resistors 8 and 10 depends upon the sensitivity of galvanometer 12 and the characteristics of rectifiers 9 and 11. Preferably, a high sensitivity instrument is used, with large resistances, to minimize loading of the inductor-resistor branches 4—5 and 6—7. As another consideration, resistors 8 and 10 should be large compared to the forward resistance of rectifiers 9 and 11, and small compared to the back resistance of the rectifiers. Voltage divider 3 preferably has a low impedance, and tap 3' is adjusted to a central point of the divider as hereinafter explained.

The operation of this circuit may best be understood by referring to a vector diagram of voltages across various parts of the circuit. The potential of terminal 1 is represented by A; the potential at tap 3' by B; the potential of terminal 2 by C; the potential at the junction of inductor 6 and resistor 7 by D; and the potential at the junction of inductor 4 and resistor 5 by E.

Figure 2:
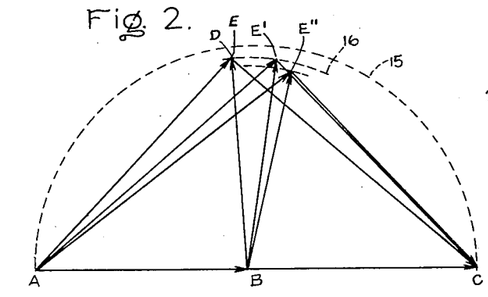
Fig. 2 is a vector diagram which will be used in explaining the operation of the circuit shown in Fig. 1.

Referring now to the vector diagram, Fig. 2, vectors $\overline{AB}$ and $\overline{BC}$ represent voltages across respective parts of voltage divider 3; vector $\overline{AD}$ represents voltage across inductor 6; vector $\overline{DC}$ represents voltage across resistor 7; vector $\overline{AE}$ represents voltage across inductor 4; and vector $\overline{EC}$ represents voltage across resistor 5.

If the impedances of inductors 4 and 6 were pure reactances, resistors 5 and 7 were pure resistances, and no current passed through rectifiers 9 and 11, points D and E would lie along semicircle 15 for all combinations of inductance and resistance values. However, because of inherent losses in the inductances, and loading due to current through the rectifiers, these points are slightly inside semicircle 15—along arc 16, for example.

The position of point B in the vector diagram can be moved horizontally by adjustment of tap 3' on voltage divider 3, and can be moved vertically by adjustment of variable capacitor 13. If capacitor 13 and tap 3' are adjusted so that point B is at the center of arc 16, changes in the reactance of the inductors, without a change in the losses, cause no change in length of vectors $\overline{BD}$ and $\overline{BE}$. For example, assume that inductor 4 and resistor 5 are identical to inductor 6 and resistor 7, respectively. Then, with no material in the field of either inductor, vectors $\overline{BD}$ and $\overline{BE}$ coincide. Now, if a magnetic ore having low losses, such as taconite, is placed in the field of inductor 4, there is a change in its inductance value, but no appreciable change in the losses. The potential now present at the junction of inductor 4 and resistor 5 is represented by point E', Fig. 2. Since the inductance of coil 4 has increased, vector $\overline{AE'}$ is larger than vector $\overline{AD}$, but since the losses remain the same, vectors $\overline{BD}$ and $\overline{BE'}$ remain equal. If tramp metal is present in the ore, there is also an increase in losses, which causes an increase in the apparent resistance of coil 4. With such added losses, the potential at the junction of inductor 4 with resistor 5 is represented by point E'', Fig. 2. Because of the added losses, the phase angle between vectors $\overline{AE}$ and $\overline{EC}$ has decreased, and point E'' lies inside of arc 16. Therefore vector $\overline{BE''}$ is smaller than vector $\overline{BD}$.

The voltage represented by vector $\overline{BE}$ is across resistor 8 and rectifier 9 in series, and thus causes a pulsating direct current to flow through this circuit. Similarly, the voltage represented by vector $\overline{BD}$ causes current to flow through resistor 10 and rectifier 11. When vectors $\overline{BD}$ and $\overline{BE}$ are equal in magnitude, the currents which they produce are likewise equal, and the direct components of voltage across resistors 8 and 10 are equal. Under these conditions, no direct current flows through D.-C. galvanometer 12. However, if increased losses cause vector $\overline{BE''}$ to be smaller than vector $\overline{BD}$, the direct voltage across resistor 8 is smaller than the direct voltage across resistor 10, and direct current flows through galvanometer 12. The galvanometer thus indicates any difference in amplitude of the two voltages represented by vectors $\overline{BD}$ and $\overline{BE}$. However, differences in phase of these two voltages do not affect the direct components of voltage across resistors 8 and 10, and hence do not actuate the galvanometer.

It will be appreciated that the circuit described is very sensitive to changes in phase angle between vectors $\overline{AE}$ and $\overline{EC}$, which represent voltage drops across inductor 4 and resistor 5, respectively, and is insensitive to changes in relative amplitude of these voltage vectors. Since the circuit is of a balanced or bridge type, normal variations in the supply voltage have little effect upon the circuit.

Initial adjustment of the circuit to detect tramp metal is made by adjusting the tap 3' and capacitor 13 to values such that placing ore without tramp metal in the magnetic field of inductor 4 causes no change in the indication of galvanometer 12. Resistor 8 may be adjusted to set the galvanometer index to zero. Then, in operation of the circuit, any subsequent galvanometer indication other than zero signals the presence of tramp metal in the ore.

In effect, D.-C. galvanometer 12 is actuated by any amplitude difference in the currents flowing through rectifiers 9 and 11, respectively. It will be appreciated that, instead of a galvanometer, other apparatus responsive to this difference current can be provided. For example, the difference current can be used to actuate control mechanism to stop automatically the ore-carrying conveyor belt whenever tramp metal is detected.

Figure 3:
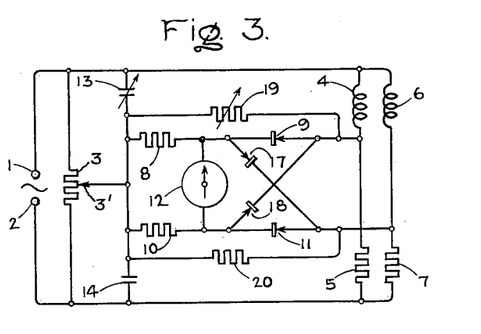
Fig. 3 is a circuit diagram showing a modification of the Fig. 1 circuit.

The circuit shown in Fig. 3 is essentially the same as the Fig. 1 circuit except that two additional rectifiers 17 and 18 have been added to provide full-wave rectification in the meter circuit. In this embodiment, establishing a zero setting of the galvanometer can be best accomplished by providing additional resistors 19 and 20 in parallel with respective branches of the meter circuit as shown. At least one of these resistors, 19 for example, should be adjustable to facilitate setting the instrument to zero.

Figure 4:
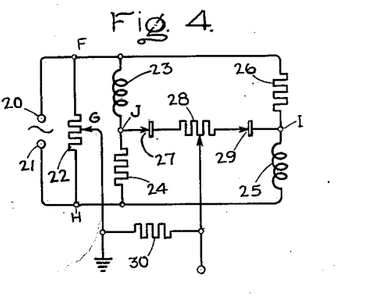
Fig. 4 is a circuit diagram of other apparatus embodying principles of this invention.

A difficulty with the Fig. 1 and Fig. 3 circuits is that galvanometer 12 is connected between two points, both of which may be at relatively high alternating potential if the voltage divider center tap is grounded, as is preferable. This may be especially undesirable when, instead of the galvanometer, vacuum tube amplifier circuits are used to provide an amplified signal for control purposes. Fig. 4 shows a circuit which does not have this disadvantage.

Referring now to Fig. 4, terminals 20 and 21 are connected to a suitable alternating current source. Across these two terminals are connected a tapped voltage divider 22, a series circuit comprising inductor 23 and resistor 24, and a series circuit comprising inductor 25 and resistor 26. The two inductor-resistor circuits are connected across the supply terminals in opposite order, as shown. A rectifier 27, a resistor 28 having a variable tap and a rectifier 29 are connected in series in the order named between the circuit junction of inductor 23 with resistor 24 and the circuit junction of inductor 25 with resistor 26. Both rectifiers have the same polarity, so that current flows through the rectifiers during substantially the same half of each alternating current cycle. A resistor 30 is connected between the tap of voltage divider 22 and the variable tap of resistor 28. In this embodiment, the tap of resistor 22 preferably is centrally positioned thereon and may be connected to ground. The output voltage is obtained across resistor 30, which arrangement is very convenient for connection to vacuum tube amplifying and control circuits. Preferably, resistor 28 has a high impedance relative to resistors 24 and 26 and reactors 23 and 25. Resistor 30 may have an even higher impedance, suitable for connection in vacuum tube circuits having high input impedance.

Figure 5:
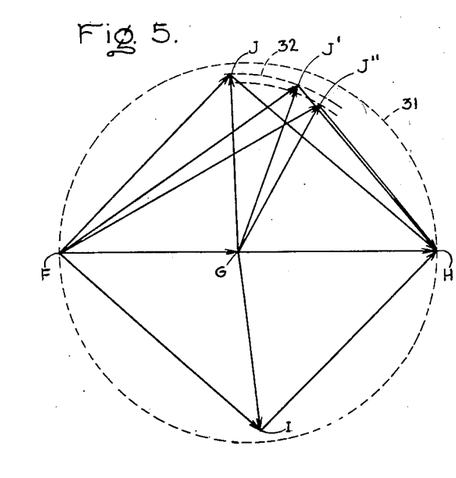
Fig. 5 is a vector diagram which will be used in explaining the operation of the Fig. 4 circuit.

Refer now to Fig. 5, which is a vector diagram illustrating operation of the Fig. 4 circuit. Point F represents the potential of terminal 20; point G the potential at the center tap of voltage divider 22; point H the potential of terminal 21; point I the potential at the circuit junction of reactor 25 with resistor 26; and point J the potential at the circuit junction of reactor 23 with resistor 24.

Except for losses, points I and J would both lie upon circle 31. Because of losses, both are slightly inside the circle. Now, assume that taconite ore is placed within the magnetic field of inductor 23. Due to the resulting increase in inductance, point J is shifted along arc 32 to point J'. However, the phase angle between vectors $\overline{FJ}$ and $\overline{JH}$ is not changed, and vector $\overline{GJ}$ remains substantially unchanged in length, so that vector $\overline{GJ'}$ equals vector $\overline{GI}$ in magnitude. Since these two vectors are equal in magnitude, equal currents flow through rectifiers 27 and 29, and no direct current flows through resistor 30. If tramp metal is present in the ore, additional losses are created, which decrease the phase angle between vectors $\overline{FJ}$ and $\overline{JH}$, and point J is shifted nearer the center of circle 31, to point J'', for example. Since vector $\overline{GI}$ is larger than vector $\overline{GJ''}$, more current flows through rectifier 29 than flows through rectifier 27. The difference between these two currents flows through resistor 30 and produces a unidirectional component of voltage across this resistor. The voltage across resistor 30 may be used to actuate a suitable instrument or control system.

Figure 6:
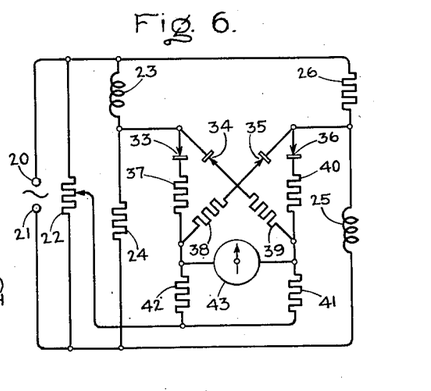
Fig. 6 is a circuit diagram of a modification of the Fig. 4 circuit.

Fig. 6 is a diagram of a circuit which employs substantially the same principle of operation as the circuit of Fig. 4, except that full wave rectification is provided in the meter circuit by rectifiers 33, 34, 35, and 36 and resistors 37, 38, 39, and 40, connected as a rectifier bridge. Added losses in reactor 23 produced by tramp metal cause direct current to flow downward through resistor 41 and upward through resistor 42. This produces a direct voltage across galvanometer 43, which indicates the added losses.

Figure 7:
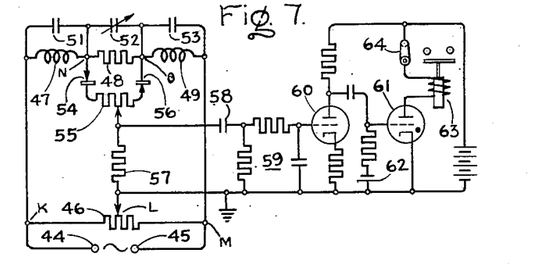
Fig. 7 is a circuit diagram of other apparatus embodying principles of this invention.

Refer now to Fig. 7, which shows another circuit embodying principles of this invention. Terminals 44 and 45 are provided for connection to a suitable alternating current source. A tapped voltage divider 46 is connected across these terminals. Also connected across these terminals are an inductor 47, a resistor 48, and an inductor 49, connected in series in the order named. Capacitors 51, 52, and 53 are connected in parallel with inductor 47, resistor 48, and inductor 49, respectively.

A rectifier 54, a tapped resistor 55, and a rectifier 56 are connected in series in the order named across the ends of resistor 48. A resistor 57 is connected between the tap of voltage divider 46 and the tap of resistor 55. The tap of voltage divider 46 may be connected to ground, and the tap of resistor 55 is connected through coupling capacitor 58 and filter network 59 to the grid of vacuum tube 60. Tube 60 is connected as a vacuum tube amplifier, with its output connected to the grid of a thyratron 61. Suitable biasing means, such as battery 62, is provided to bias tube 61 to cutoff. In the plate circuit of tube 61 is the energizing coil of a relay 63. A normally closed switch 64 is connected in series with relay 63 for resetting the circuit as hereinafter explained.

Preferably, the impedance of resistor 48 is about one-tenth to one-fifth the impedance of reactors 47 and 49. Resistor 48 is just large enough for the voltage drop across the resistor to operate rectifiers 54 and 56. Resistors 55 and 57 have values such that $$\frac{R_{55}}{4} + R_{57}$$

is large compared to the forward resistance of rectifiers 54 and 56, but is small compared to the back resistance of the rectifiers.

Figure 8:
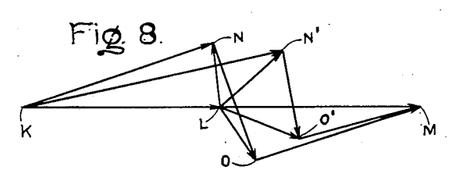
Figs. 8 and 9 are vector diagrams which will be used in explaining the operation of the Fig. 7 circuit.

In Fig. 8, which is a vector diagram illustrating voltage relations in the Fig. 7 circuit, point K represents the potential of terminal 44; point L the potential at the center tap of voltage divider 46; point M the potential of terminal 45; point N the potential at the circuit junction of inductor 47 with resistor 48, and point O the potential at the circuit junction of inductor 49 with resistor 48. If the tap of voltage divider 46 is adjusted so that vector $\overline{KL}$ equals vector $\overline{LM}$, and if the voltage drop across resistor 48 is exactly in phase quadrature with the voltage drop across reactors 47 and 49, so that vector $\overline{NO}$ is perpendicular to vectors $\overline{KN}$ and $\overline{OM}$, then vector $\overline{LN}$ is equal in magnitude to vector $\overline{LO}$ for any combination of inductance and resistance values. Adjustable capacitor 52 is provided in parallel with resistor 48 so that the phase of voltage across the resistor can be properly adjusted to obtain this relation, despite inherent losses in the reactors. Capacitors 51 and 53 increase the sensitivity of the circuit by reducing the ratio of net inductive reactance to losses.

When a low loss material such as taconite ore is placed in the magnetic field of inductor 47, the potentials at points N and O may be shifted to points N' and O' respectively, due to an increase in the inductance of coil 47. But if there is no appreciable change in the losses, vector $\overline{N'O'}$ maintains its perpendicular relation to vector $\overline{KN'}$ and $\overline{O'M}$. Therefore vector $\overline{LN'}$ is equal in magnitude to vector $\overline{LO'}$, and equal currents flow through rectifiers 54 and 56. Therefore no direct current flows through resistor 57.

Figure 9:
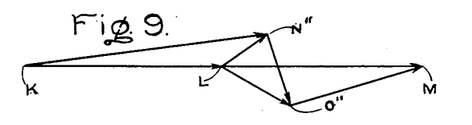

Refer now to Fig. 9, which is a vector diagram representing voltages present when tramp metal is within the magnetic field of reactor 47. Eddy currents in the tramp metal produce additional electrical losses, which change the phase angle of voltage across inductor 47. Because of this change in phase angle, vector $\overline{N''O''}$ is not perpendicular to vector $\overline{KN''}$ and therefore vector $\overline{LO''}$ is larger than vector $\overline{LN''}$. In this situation, more current flows through rectifier 56, Fig. 7, than flows through rectifier 54, which produces a direct current upward through resistor 57.

If reactor 47, Fig. 7, is placed adjacent to an ore-carrying conveyor belt, so that the ore passes through the magnetic field of the reactor, any tramp metal in the ore causes an impulse of direct current to flow upward through resistor 57 as the tramp metal passes reactor 47. This produces a negative voltage impulse which is transmitted by coupling capacitor 58 to the grid of vacuum tube 60. Low-pass filter 59 is provided to filter out alternating voltage of the supply frequency, but since the impulses produced by tramp metal passing reactor 47 are equivalent to frequencies much lower than the supply frequency, these impulses are transmitted through the filter. The negative voltage impulse produces an amplified positive impulse at the plate of vacuum tube 60, which is transmitted to the grid of tube 61 and causes this tube to conduct. The resulting current actuates relay 63, which may stop the conveyor belt so that the tramp metal can be removed. To reset the circuit, switch 64 is opened, which interrupts current through thyratron 61 and relay 63 and permits the grid bias voltage to regain control of the thyratron.

Figure 10:
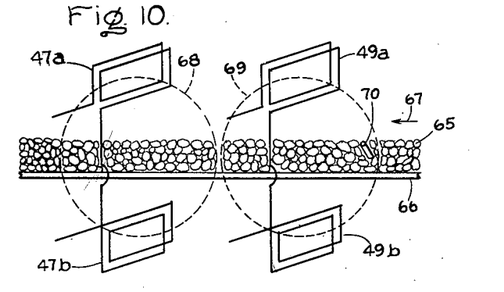
Fig. 10 is a schematic diagram illustrating an arrangement of inductors for detecting tramp metal in ore being carried by a conveyor belt.

With this circuit, increased sensitivity can be obtained by placing both inductors near the conveyor belt, so that the ore passes first through the field of inductor 49, then through the field of inductor 47. An example of how this may be done is illustrated in Fig. 10. Referring now to this figure, ore 65 is carried by a conveyor belt 66 moving in the direction indicated by arrow 67. Inductor 47 comprises two coils 47a and 47b positioned above and below the conveyor belt, respectively, and connected in series so that inductor 47 has a magnetic field represented by broken line 68 which passes through the ore. In like manner, inductor 49 comprises two coils 49a and 49b positioned above and below the conveyor belt, respectively, and connected in series so that inductor 49 has a magnetic field represented by broken line 69 which also passes through the ore. As the conveyor belt moves, each portion of the ore passes first through the magnetic field of inductor 49, and then through the magnetic field of inductor 47. A piece of tramp metal in the ore is represented at 70.

Refer now to the circuit shown in Fig. 7. As the tramp metal passes inductor 49, current flows downward through resistor 57 and charges capacitor 58 positively. Then, as the tramp metal moves into the field of inductor 47, the current through resistor 57 reverses, and a relatively large negative voltage impulse is applied to the grid of tube 60.

A comparable arrangement is possible with the other circuits herein described. For example, in the Fig. 1 circuit, inductors 4 and 6 could both be placed near an ore-carrying conveyor belt, so that the ore passes first through the field of one inductor 6 for example, and then through the field of the other. As tramp metal passes inductor 6, galvanometer 12 deflects in one direction, and as the tramp metal passes 4, the galvanometer deflects in the opposite direction. This provides a large, easily noticed swing of the galvanometer index from one side to the other; or, when control circuits are used in place of the galvanometer, provides a large electrical signal to actuate such circuits. When the Fig. 4 circuit is used, both inductors 23 and 25 may be placed near the conveyor belt, for increased sensitivity.

Figure 11:
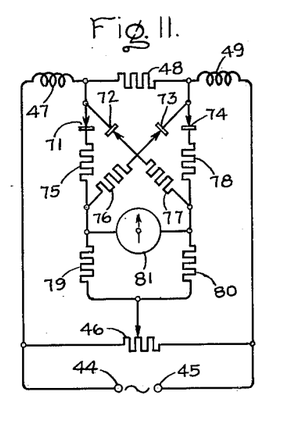
Fig. 11 is a circuit diagram showing a modification of the Fig. 7 circuit.

Fig. 11 is a circuit diagram showing a modification of the Fig. 7 circuit having full-wave rectification in the meter circuits. Operation of the two circuits is substantially the same, except that a bridge-type rectifying circuit comprising rectifiers 71, 72, 73, and 74 and resistors 75, 76, 77, and 78 is connected across resistor 48. Any change in relative losses within the reactor coils causes direct currents to flow in opposite directions through resistors 79 and 80. This produces a voltage across galvanometer 81, which indicates the added losses.

Figure 12:
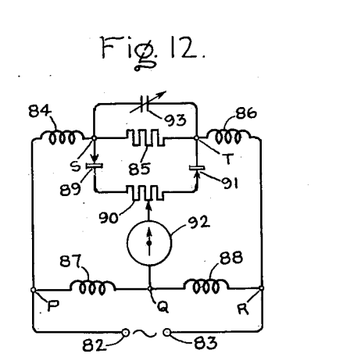
Fig. 12 is a circuit diagram showing another modification of the Fig. 7 circuit.

In Fig. 12, which shows another modification of the Fig. 7 circuit, terminals 82 and 83 are provided for connection to a suitable source of alternating current. Connected across these terminals is a first circuit branch comprising reactor 84, resistor 85, and reactor 86 connected in series, and a second circuit branch comprising two reactors 87 and 88. Connected in series between the two ends of resistor 85 are a first rectifier 89, a tapped resistor 90, and a second rectifier 91. The two rectifiers have the same polarity, so that both conduct during the same half-cycle of the alternating current through resistor 85. Connected between the tap of resistor 90 and the circuit junction between reactors 87 and 88 is a galvanometer 92, or other device which may be actuated by direct current. Preferably, a variable capacitor 93 is connected in parallel with resistor 85.

When the losses associated with reactor 84 or reactor 86, or both, are varied, the operation of this circuit is substantially the same as the previously explained operation of the Fig. 7 circuit. However, a second mode of operation is possible when the varying losses are associated with reactor 87 or reactor 88, or both. For example, reactors 87 and 88 can be coils positioned adjacent to material to be inspected, and reactors 84 and 86 can have constant impedances.

Figure 13:
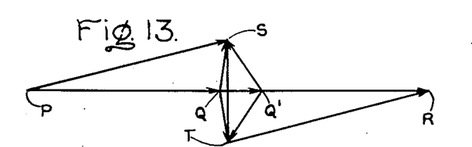
Figs. 13 and 14 are vector diagrams which will be used in explaining one mode of operation of the Fig. 12 circuit.
Figure 14:
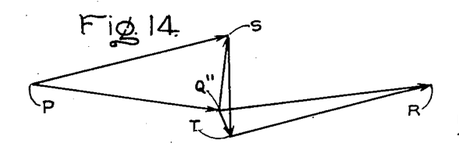

This second mode of operation can best be understood by referring to the vector diagrams, Figs. 13 and 14. When the losses associated with reactors 87 and 88 are equal, the voltage relations in the circuit are substantially as shown in Fig. 13, where point P represents the potential at terminal 82; point Q the potential at the circuit junction between reactors 87 and 88; point R the potential at terminal 83; point S the potential at the circuit junction between elements 84 and 85; and point T the potential at the circuit junction between elements 85 and 86. Preferably capacitor 93 is adjusted so that vector $\overline{ST}$ is substantially perpendicular to vectors $\overline{PQ}$ and $\overline{QR}$. As the relative inductances of reactors 87 and 88 change, the potential at point Q may be shifted horizontally in the vector diagram of Fig. 13, to Q', for example. Such a change, however, does not affect the equality of vectors $\overline{QS}$ and $\overline{QT}$. Therefore, vector $\overline{Q'S}$ is equal to vector $\overline{Q'T}$, and consequently, equal direct currents flow through rectifiers 89 and 91, Fig. 12, and in opposite directions through galvanometer 92, so that the galvanometer index remains at zero.

However, as the losses associated with reactors 87 and 88 become unequal, the phase angle between vectors $\overline{PQ}$ and $\overline{QR}$ changes. This is illustrated in the vector diagram shown in Fig. 14. Referring to this figure, a change in the losses associated with reactor 87 or reactor 88 may cause the potential at point Q to shift to point Q'', as shown in Fig. 14. It is evident that after such a change vector $\overline{Q''S}$ is not equal to vector $\overline{Q''T}$, and therefore more current flows through one of the rectifiers shown in Fig. 12 than flows through the other. The difference between these two currents flows through galvanometer 92, and actuate the galvanometer to move its index away from zero.

The principles of the invention are not limited to the detection of tramp metal in ore, as numerous other applications will occur to those skilled in the art. For example, the circuits herein described may be used in the magnetic inspection of metals, where certain flaws or changes in the properties of a metal may produce changes in the electrical losses produced when the metal is placed in an alternating electromagnetic field. By substituting capacitors for the inductors in the circuits described, the characteristics of dielectric materials may be monitored.

Figure 15:
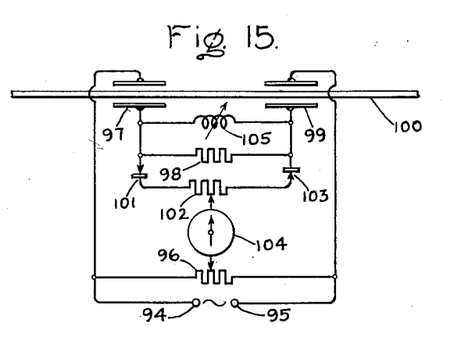
Fig. 15 is a schematic diagram of apparatus embodying principles of this invention useful for measuring electrical losses in a dielectric material.

Refer now to Fig. 15, which is a schematic diagram showing such a modification. Terminals 94 and 95 are provided for connection to a suitable alternating current source. Connected across these terminals are a tapped voltage divider 96 and a series circuit branch comprising capacitor 97, resistor 98 and capacitor 99 connected together in the order named. Capacitors 97 and 99 may each comprise a pair of parallel plates between which a moving sheet of dielectric material 100 may pass. Connected in series between the two ends of resistor 98 are a first rectifier 101, a tapped resistor 102, and a second rectifier 103. A galvanometer 104, or other device actuated by direct current, is connected between the tap of resistor 102 and the tap of voltage divider 96. Preferably a variable inductor 105 is connected in parallel with resistor 98 for adjusting the phase angle of the voltage drop across the resistor. The operation of this circuit is substantially the same as the operation of the Fig. 7 circuit, except that the losses indicated are those produced by variations in dielectric material 100.

At times one may desire to measure changes in the reactance of a reactor. For example, in magnetic testing of materials, certain defects produce changes in magnetic reluctance. A circuit modification for accomplishing this is shown in Fig. 16.

Figures 16, 17:
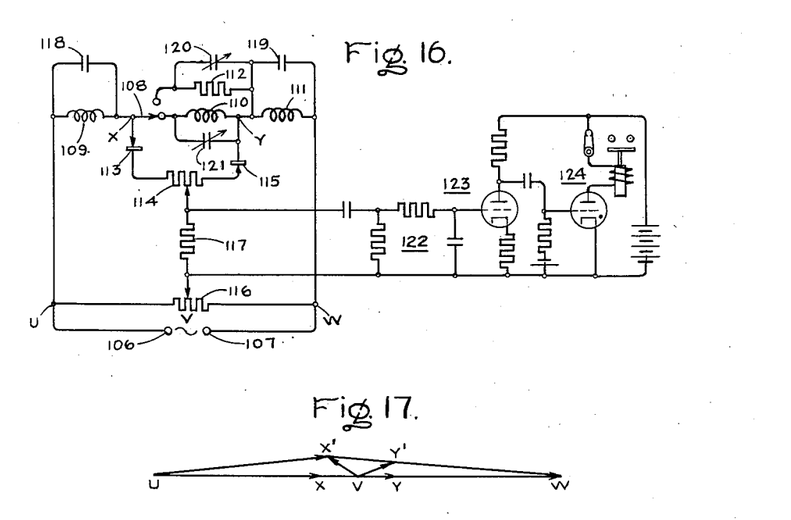
Fig. 16 is a circuit diagram of another modification of the Fig. 7 circuit.
Figs. 17 and 18 are vector diagrams which will be used in explaining one mode of operation of the Fig. 16 circuit.

Referring now to Fig. 16, terminals 106 and 107 are provided for connection to a suitable alternating current source. Switching means 108 is provided to connect in a series circuit branch between terminals 106 and 107, either the combination of reactor 109, reactor 110, and reactor 111, or the combination of reactor 109, resistor 112, and reactor 111, selectively. Connected in series between the circuit junction of reactor 109 with the center element of this circuit branch and the circuit junction of the center element with reactor 111 are a rectifier 113, a tapped resistor 114, and a rectifier 115.

Also connected between terminals 106 and 107 is a tapped voltage divider 116. Connected between the tap of resistor 114 and the tap of voltage divider 116 is a resistor 117. Preferably a capacitor 118 is connected in parallel with reactor 109; a capacitor 119 in parallel with reactor 111, a variable capacitor 120 in parallel with resistor 112, and a variable capacitor 121 in parallel with reactor 110.

Connected across resistor 117 is a low-pass filter 122, which attenuates voltage of the alternating current supply frequency and transmits voltage of lower frequency. Connected in voltage responsive relation to filter 122 is a vacuum tube amplifier 123, and connected in voltage responsive relation to the amplifier is a relay circuit 124.

When switch 108 is in its upper position, so that resistor 112 is connected in the circuit, the circuit is effectively the same as the Fig. 7 circuit, and responds to changes in the losses associated with reactors 109 and 111. However, when switch 108 is in its lower position, as shown in the drawing, so that reactor 110 is connected in the circuit, this circuit indicates changes in the relative reactance of inductors 109 and 111.

Figure 18:
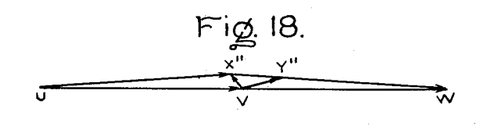

This can best be understood by referring to the vector diagrams shown in Figs. 17 and 18. In these diagrams point U represents the potential at terminal 106, Fig. 16; point V represents the potential at the tap of voltage divider 116; point W the potential at terminal 107; point X the potential at the circuit junction of reactor 109 with the center element of the series circuit branch; and point Y the potential at the circuit junction of reactor 111 with the center element of the circuit branch. If the losses associated with reactor 109, for example, change, the phase angle between vectors $\overline{UX}$ and $\overline{XY}$ changes, so that both point X and point Y may be moved to new positions in the vector diagram—to X' and Y', for example. However, such movement does not substantially affect the equality of vectors $\overline{VX}$ and $\overline{VY}$, so that vector $\overline{VX'}$ equals vector $\overline{VY'}$ and the currents through rectifiers 113 and 115 remain equal.

However, if a change in the relative reactances of inductors 109 and 111 occurs, points X and Y are shifted to points such as X'' and Y'', Fig. 18. This causes an inequality between vector $\overline{VX''}$ and vector $\overline{VY''}$, so that more current flows through one of the rectifiers in the Fig. 16 circuit than flows through the other rectifier. The difference between these currents flows through resistor 117, thereby creating a signal which is transmitted through filter 122 and amplified by amplifier 123 to actuate relay circuit 124.

The Fig. 16 circuit is thus very versatile, since it can be used to measure either resistance or reactance changes by proper positioning of switch 108.

Circuits embodying principles of this invention may be used to inspect electrical circuit elements, as well as to inspect materials as has been described. For example, if reactors are to be inspected for excessive losses, they may each be inserted successively in place of reactor 4 in the circuit of Fig. 1, or in place of a comparable reactor in any of the other circuits, such as reactor 47 in the Fig. 7 circuit. Any reactor having losses substantially different from those of the standard reactor 4 causes an indication of the galvanometer, or other direct current actuated device. Instead of substituting the reactor to be tested for the reactor in the circuit, it may be connected in parallel with that reactor, and the increased losses indicated. Similarly, the inductance of resistors may be checked by inserting the resistor to be tested in place of resistor 5, Fig. 1, or a comparable resistor in the other circuits. To use the Fig. 7 circuit to inspect resistors in this manner, the circuit may be modified to make elements 47 and 49 resistors, and element 48 a reactor. To check the reactance of reactors or the resistance of resistors, circuits such as that shown in Fig. 16 can be used, with switch 108 in its lower position, in which all three elements in the series circuit branch are of the same type. For example, if reactors are to be tested, elements 109, 110, and 111 would be reactors; if capacitors or resistors are to be tested, these three circuit elements may be capacitors or resistors, respectively.

If the Fig. 1 circuit is to be used in a manner similar to the Fig. 16 circuit, with switch 108 in its lower position, by making elements 4 and 7 of the same type as elements 4 and 6, voltage divider 3 should be changed to a reactor and a resistor in series, with point B connected at the circuit junction of these two elements.

Having described the principles of this invention and the best mode in which I have contemplated applying those principles, I wish it to be understood that the examples described are illustrative only, and that other means can be employed without departing from the true scope of the invention.

What I claim as new and desire to secure by Letters Patent of the United States is:

1. Material testing apparatus comprising alternating current supply connections having two-phase terminals and a neutral terminal, a passive circuit including at least two reactances having resistive impedance components connected across said two-phase terminals, one of the said reactance elements being constructed to permit placing of the material tested in its electromagnetic field, and output means including a pair of rectifiers connected between said neutral terminal and respective ones of said reactance elements and actuated by changes in amplitude of the voltage between said reactance elements and said neutral terminal.

2. Material testing apparatus comprising alternating current supply connections having two-phase terminals and a neutral terminal, a passive circuit of reactance and resistance elements in series connected across said two-phase terminals, said circuit including first and second reactors, each connected at one end to a two-phase terminal and at the other end to a resistance element, said first reactor being constructed to permit placing of the material tested in its electromagnetic field, and voltage comparison means operatively connected intermediate the resistance-connected ends of said reactors and said neutral terminal for comparing the amplitudes of the voltages of the respective resistance-connected ends of said reactors with respect to the neutral terminal.

3. Material testing apparatus comprising a four-legged bridge circuit having reactors in two legs and resistors in the other two legs, at least one of said reactors being constructed to permit placing of the material tested in its electromagnetic field, alternating current supply connections for applying alternating voltage across two diametrically opposite corners of said bridge circuit, a terminal which is neutral with respect to said supply connections, and voltage comparison means operatively connected intermediate the neutral terminal and the two remaining diametrically opposite corners of said bridge circuit for actuation by differences in amplitude of the voltages from said neutral terminal to each of the other two diametrically opposite corners of said bridge circuit.

4. Material testing apparatus comprising alternating current supply connections, a center tapped voltage divider connected across said supply connections, two circuit branches each composed of a reactor and a resistor in series connected across said supply connections, one of said reactors being constructed to permit placing of the material tested in its electromagnetic field, first and second rectifying means including load impedances respectively connected between the center tap of said voltage divider and the reactor-resistor junctions of said two circuit branches respectively, and current comparison means connected intermediate said rectifying means for actuation by a difference in value between the direct currents respectively flowing through said first and second rectifying means.

5. Ore testing apparatus for locating tramp metal, comprising alternating current supply connections, a tapped voltage divider connected across said supply connections, two circuit branches each composed of an air-core inductor and a resistor connected in series in the same order across said supply connections, at least one of said inductors being constructed to permit placing of ore within its magnetic field, a two-terminal direct current responsive device, two resistors connected between the tap of said voltage divider and respective terminals of said device, and two rectifiers connected with like polarity between respective terminals of said device and respective inductor-resistor junctions of said two circuit branches.

6. Ore testing apparatus for locating tramp metal comprising alternating current supply connections, a tapped voltage divider connected across said supply connections, two circuit branches each composed of an air-core inductor and a resistor connected in series in opposite order across said supply connections, one of said inductors being constructed to permit the placing of ore within its magnetic field, two rectifiers and a tapped resistor connected in series between the respective inductor-resistor junctions of said two circuit branches, said rectifiers having the same polarity and said tapped resistor being connected between the two rectifiers, and a resistor connected between the tap of said voltage divider and the tap of said tapped resistor.

7. Electrical testing apparatus comprising an alternating current circuit having first, second and third terminals, a circuit branch composed of first, second and third impedance elements connected in series in the order named between said first and third terminals, first rectifying means connected between said second terminal and the circuit junction between said first and second impedance elements, second rectifying means connected between said second terminal and the circuit junction between said second and third impedance elements, and output means operatively connected intermediate said rectifying means and actuated by differences in value of direct currents flowing through said first and second rectifying means respectively.

8. Electrical testing apparatus comprising alternating current supply connections, a first circuit branch comprising first, second, and third impedance elements connected in series in the order named across said supply connections, a second circuit branch comprising fourth and fifth impedance elements connected in series across said supply connections, first rectifying means connected between the circuit junction of said first and second impedance elements and the circuit junction of said fourth and fifth impedance elements, second rectifying means connected between the circuit junction of said second and third impedance elements and the circuit junction of said fourth and fifth impedance elements, and output means operatively connected intermediate said rectifying means and actuated by differences in value of direct currents flowing through said first and second rectifying means respectively.

9. Material testing apparatus comprising alternating current supply connections having two-phase terminals and a neutral terminal, a circuit including a resistor and two reactors connected in series across said two-phase terminals, the resistor being connected between the two reactors, at least one of said reactors being constructed to permit placing of the material tested in its electromagnetic field, and voltage comparison means connected for actuation by differences in amplitude of the voltages from said neutral terminal to respective ends of said resistor.

10. Material testing apparatus comprising alternating current supply connections, a tapped voltage divider connected across said supply connections, two reactors and a resistor connected in series across said supply connections, the resistor being connected between the two reactors, at least one of said reactors being constructed to permit placing of the material tested in its electromagnetic field, rectifying circuits connected between the tap of said voltage divider and respective ends of said resistor, and means actuated by differences between the respective direct currents through said rectifying circuits.

11. Ore testing apparatus for locating tramp metal, comprising alternating current supply connections, a tapped voltage divider connected across said supply connections, two air-core inductors and a first resistor connected in series across said supply connections, the first resistor being connected between the two inductors, said inductors being constructed to permit placing of ore within their respective electromagnetic fields, a capacitor connected in parallel with said first resistor, a tapped resistor and two rectifiers connected in series across said first resistor, the rectifiers being connected to opposite ends of said tapped resistor, circuit connections between the tap of said tapped resistor and the tap of said voltage divider, and means actuated by direct current flowing through said circuit connections.

12. Electrical testing apparatus comprising alternating current supply connections, a first circuit branch comprising first, second and third impedance elements connected in series in the order named across said supply connections, a second circuit branch comprising fourth and fifth impedance elements connected in series across said supply connections, a first rectifying circuit connected between the circuit junction of said first and second impedance elements and the circuit junction of said fourth and fifth impedance elements, a second rectifying circuit connected between the circuit junction of said second and third impedance elements and the circuit junction of said fourth and fifth impedance elements, said first and second rectifying circuits including a common resistor and having opposite polarities so that the respective direct currents which flow through the first and second rectifying circuits flow in opposite directions through the common resistor, a low pass filter which attenuates alternating voltage of the supply frequency and transmits voltage of lower frequency connected across said common resistor, an amplifier connected to said low-pass filter in responsive relation to voltage transmitted thereby, and a relay circuit connected in voltage-responsive relation to said amplifier.

13. Electrical testing apparatus comprising an alternating current circuit having first, second and third terminals, a circuit branch composed of first, second and third impedance elements of the same type connected in series in the order named between said first and third terminals, first rectifying means connected between said second terminal and the circuit junction between said first and second impedance elements, second rectifying means connected between said second terminal and the circuit junction between said second and third impedance elements, and output means operatively connected intermediate said first and second rectifying means and said second terminal and actuated by differences in value of direct currents flowing through said first and second rectifying means respectively.

14. Electrical testing apparatus comprising alternating current supply connections, first, second and third reactors, a resistor, switching means for selectively connecting the combination of said first, second and third reactors or the combination of said first reactor, said resistor, and said third reactor in the order named in a series circuit branch across said supply connections, a tapped voltage divider connected across said supply connections, first rectifying means connected between the tap of said voltage divider and the circuit junction of said first reactor with the center element in said series circuit branch, second rectifying means connected between the tap of said voltage divider and the circuit junction of said third reactor with the center element in said series circuit branch, and output means operatively connected intermediate said first and second rectifying means and the tap of said voltage divider and actuated by differences in value of direct currents flowing through said first and second rectifying means respectively.

CHARLES W. CLAPP.

REFERENCES CITED

The following references are of record in the file of this patent:

UNITED STATES PATENTS

| Number | Name | Date |
|---|---|---|
| 1,518,543 | Nyquist | Dec. 9, 1924 |
| 1,847,127 | Mayer | Mar. 1, 1932 |
| 2,124,577 | Knerr | July 26, 1938 |
| 2,237,254 | Broekhuysen | Apr. 1, 1941 |
| 2,329,098 | Browning et al. | Sept. 7, 1943 |
| 2,434,203 | Farrow | Jan. 6, 1948 |
| 2,495,627 | Bovey | Jan. 24, 1950 |
| 2,503,721 | Angell | Apr. 11, 1950 |